United States Patent
Ring et al.

(10) Patent No.: US 7,341,128 B2
(45) Date of Patent: Mar. 11, 2008

(54) DISK BRAKE ARRANGED TMX

(75) Inventors: Michael E. Ring, Saint John, IN (US); James M. Zemyan, Wilmerding, PA (US); Michael J. Moriarity, Lansing, MI (US)

(73) Assignee: WABTEC Holding Corp., Wilmerding, PA (US)

( * ) Notice: Subject to any disclaimer, the term of this patent is extended or adjusted under 35 U.S.C. 154(b) by 93 days.

(21) Appl. No.: 11/008,018

(22) Filed: Dec. 9, 2004

(65) Prior Publication Data
US 2006/0124401 A1    Jun. 15, 2006

(51) Int. Cl.
*B61H 13/00* (2006.01)
*F16D 51/00* (2006.01)
(52) U.S. Cl. .................. 188/33; 188/72.7; 188/343
(58) Field of Classification Search .................. 188/33, 188/34, 47, 46, 49–55, 107, 58–59, 153, 188/198, 197, 217, 219.1, 190, 192, 207, 188/72.7, 72.9, 72.6, 343
See application file for complete search history.

(56) References Cited

U.S. PATENT DOCUMENTS

| | | | |
|---|---|---|---|
| 3,148,749 A | * | 9/1964 | Bushnell ..................... 188/59 |
| 3,337,006 A | * | 8/1967 | Pelikan ....................... 188/59 |
| 3,344,893 A | | 10/1967 | Pelikan ....................... 188/58 |
| 3,986,584 A | * | 10/1976 | Wright et al. ............. 188/71.8 |
| 4,337,690 A | * | 7/1982 | Severinsson ................ 92/129 |

FOREIGN PATENT DOCUMENTS

| | | |
|---|---|---|
| DE | 754463 | 10/1952 |
| EP | 879751 | 11/1998 |

\* cited by examiner

*Primary Examiner*—Melody M. Burch
(74) *Attorney, Agent, or Firm*—James Ray & Assoc.

(57) ABSTRACT

A brake rigging for a railway vehicle having a singular truck-mounted brake apparatus for generating a braking force and a plurality of disk caliper assemblies for applying the braking force to each wheel. Wedge-like elements are rigidly attached to the braking beams of the truck-mounted brake apparatus and engage a pair of rollers that are pivotably mounted on corresponding ends of a pair of pivoted levers disposed within a disk caliper assembly. The wedge-like elements transmit a generated braking force to the levers, the rocking of which in opposite directions is effective to force the brake shoes against the respective opposite sides of a disc brake rotor to exert the braking force thereon.

7 Claims, 3 Drawing Sheets

DISK BRAKE ARRANGED TMX

FIELD OF THE INVENTION

The present invention relates, in general, to brake rigging for use on a railway vehicle and, more particularly, the instant invention relates to a truck-mounted type brake assembly employing wedge actuated disk caliper assemblies.

BACKGROUND OF THE INVENTION

As is generally well known in the railway industry, truck mounted braking systems comprise, in addition to a pair of brake beams, a series of force transmitting members such as levers and linkages, which function to move a group of brake shoes against the wheels of a railway vehicle to effect stoppage of such railway vehicle.

The force-transmitting levers are pivotally connected to each brake beam at its midpoint and utilize lever arms for connection to the force-transmitting members. One of the force-transmitting members is a slack adjuster device, the other force-transmitting member includes a pneumatically actuated brake cylinder device, the body of which is mounted on a first brake beam between the beam tension and compression members adjacent the strut bar, and a connecting rod disposed intermediate the transfer lever arm of a second brake beam and the cylinder body.

The brake cylinder piston push rod is connected to the transfer lever arm of the first brake beam. The cylinder initiates movement of this series of force transmitting members, levers and linkages to apply the brakes of the railway vehicle mounted to a truck assembly of the railway vehicle. A well known type of truck mounted braking systems is a TMX.RTM. truck mounted braking system (TMX.RTM. is a registered trademark of Westinghouse Airbrake Company, the assignee of the present invention).

The TMX was designed for the standard North American three-piece railway truck application. In this brake application, TMX simultaneously exerts an outward brake shoe force to an exterior wheel surface of each wheel disposed within a railway truck. Applications where brake shoe force is high can cause an unwanted movement in the wheel axle area of the truck.

U.S. Pat. No. 3,148,749 teaches a well-known type of disk brake assembly comprising a pair of pivoted brake-shoe-carrying levers or tongs that are actuated by movement of a wedge member between rollers mounted on the outer ends of the levers to thereby rock these levers until the brake shoes are forced into frictional engagement with the opposite sides of a rotor. Furthermore, U.S. Pat. No. 4,337,690 teaches a BFC brake system utilizing a fluid pressure actuated cylinder employing wedges attached to a piston which transmits force to the brake shoe upon pressurization of such cylinder.

The teachings of U.S. Pat. No. 3,148,749 and U.S. Pat. No. 4,337,690 are incorporated herein by reference thereto.

The application of these types of disk brake systems requires installation thereof at each wheel of the railway truck thereby significantly increasing overall brake system costs.

As it can be seen from the above discussion it is desirable to improve TMX.RTM braking system performance to eliminate this unwanted movement and provide a more economical alternative to a standard disk thread brake unit.

SUMMARY OF THE INVENTION

The present invention provides a truck-mounted braking apparatus for generating braking force through cooperation of the pneumatic cylinder and rigid linkage members. A wedge-like element attached to the rigid linkage disposed within the truck-mounted brake assembly transmits generated braking force to a plurality of disk caliper assemblies. The disk caliper assemblies employ a plurality of disk brake shoe assemblies for applying such generated force to each wheel of the railway vehicle. The disk shoe brake assemblies are disposed within brake head assemblies which are attached to the first end of a lever which is disposed within each of the disk caliper assemblies being pivotably mounted to a bracket attached to the rigid structure of the railway vehicle truck. A plurality of rollers are attached to the distal end of each lever for receiving the force transmitted by the wedge-like elements. Floating type spring assemblies engaging the disk caliper assembly are employed to maintain the disk caliper assemblies in the nominal position and compensate for the truck movement during brake application.

OBJECTS OF THE INVENTION

It is a primary object of the present invention to provide a truck-mounted brake apparatus for a railway vehicle which substantially minimizes unwanted truck movement during a brake application.

It is a further object of the invention to provide a truck-mounted brake apparatus for a railway vehicle which decreases overall system costs.

It is another object of the invention to provide a truck-mounted brake apparatus for a railway vehicle which allows system wear compensation.

It is additional object of the present invention to provide a truck-mounted brake apparatus for a railway vehicle which is easily retrofitted into existing brake systems.

In addition to the various objects and advantages of the present invention which have been generally described above, there will be various other objects and advantages of the invention that will become more readily apparent to those persons skilled in the relevant art from the following more detailed description of the invention, particularly, when the detailed description is taken in conjunction with the attached drawing figures and with the appended claims.

DETAILED DESCRIPTION OF VARIOUS EMBODIMENTS OF THE INVENTION

Figure 1:
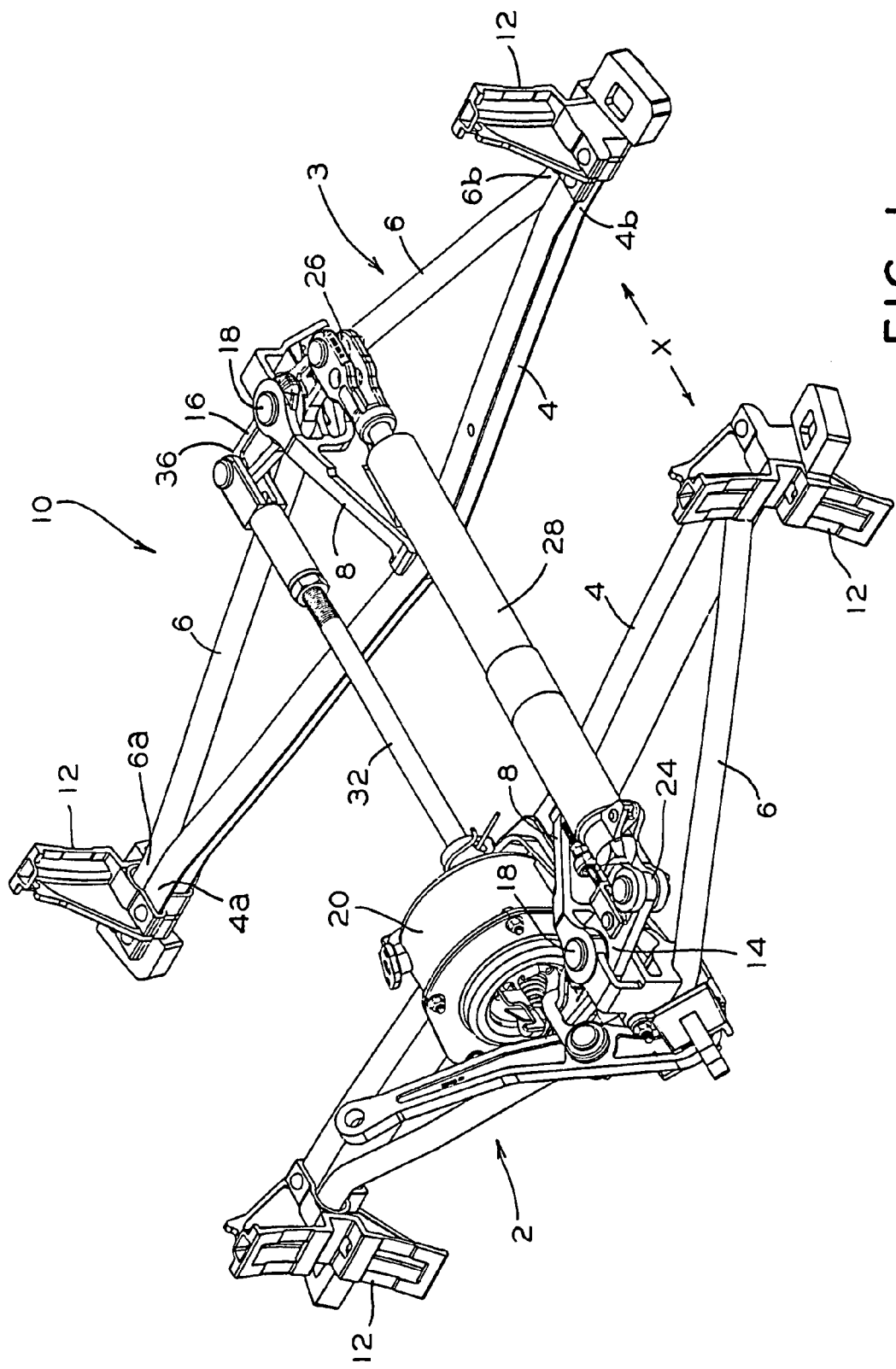
FIG. 1 is a perspective view of a prior art type railway vehicle truck-mounted TMX brake apparatus.

Prior to proceeding with the more detailed description of the invention, a description of a TMX truck mounted braking system and its functioning should be helpful in understanding the present invention. Also, it should be noted that for the sake of clarity, identical components which have identical functions have been identified with identical reference numerals throughout the several views illustrated in the attached drawing figures.

Referring now to FIG. 1, there is shown a truck-mounted brake assembly, generally designated 10, for a railway car (not shown). This brake assembly 10 comprises brake beams, generally designated 2 and 3, which are substantially identical. Each of the brake beams 2 and 3 include a compression member 4, a tension member 6 and a strut member 8. The opposite ends of the compression member 4 and the tension member 6 may be permanently connected together, preferably, by welding along an outer segment 4a-6a, 4b-6b at the opposite ends of the compression member 4 and the tension member 6.

At a location substantially midway between their opposite ends, the compression member 4 and the tension member 6 of the, respective, brake beams 2 and 3 are spaced apart sufficiently to allow connection of the strut member 8 therebetween. Mounted on the respective outer end segments 4a-6a of the brake beams 2 and 3 are brake heads 12.

A pair of force-transfer levers 14 and 16 are pivotally connected by pins 18 to the strut member 8 of the respective brake beams 2 and 3. Each end 24 and 26 of the respective force-transfer levers 14 and 16 is interconnected via a force-transmitting member 28, which may be in the form of a slack adjuster device. A brake cylinder assembly, generally designated 20, is mounted on the brake beam 2 and is associated with force-transfer lever 14, as described in detail below. A connecting means 31 is provided for connecting the brake cylinder assembly 20 to a force-transmitting member or a return push rod assembly 32. This return push rod assembly 32 is secured at an opposite end with an end 36 of the force-transfer lever 16.

When a brake application is made, pressurization of the brake cylinder assembly 20 will result in actuation of an air brake cylinder piston (not shown) disposed within such brake cylinder assembly 20 which is associated with a force transfer lever 14 via a push rod 38 such that actuation of the brake cylinder 20, in this manner, will result in a movement of a push rod 38 in a direction to effect a counterclockwise rotation of the force-transfer lever 14. The force transfer lever 14, in turn, causes the slack adjuster assembly 28 to effect counterclockwise rotation of the force-transfer lever 16 and consequent force acting on the return push rod assembly 32.

The force-transfer levers 14 and 16, along with the slack adjuster assembly 28, the return push rod assembly 32 and the brake cylinder assembly 20 comprise a brake beam actuating linkage that interconnects brake beams 2 and 3 via the pivot pins 18 and thus the required brake actuation forces effectively act along these pivot pins 18. The resultant of these forces is shown at X.

Figure 2:
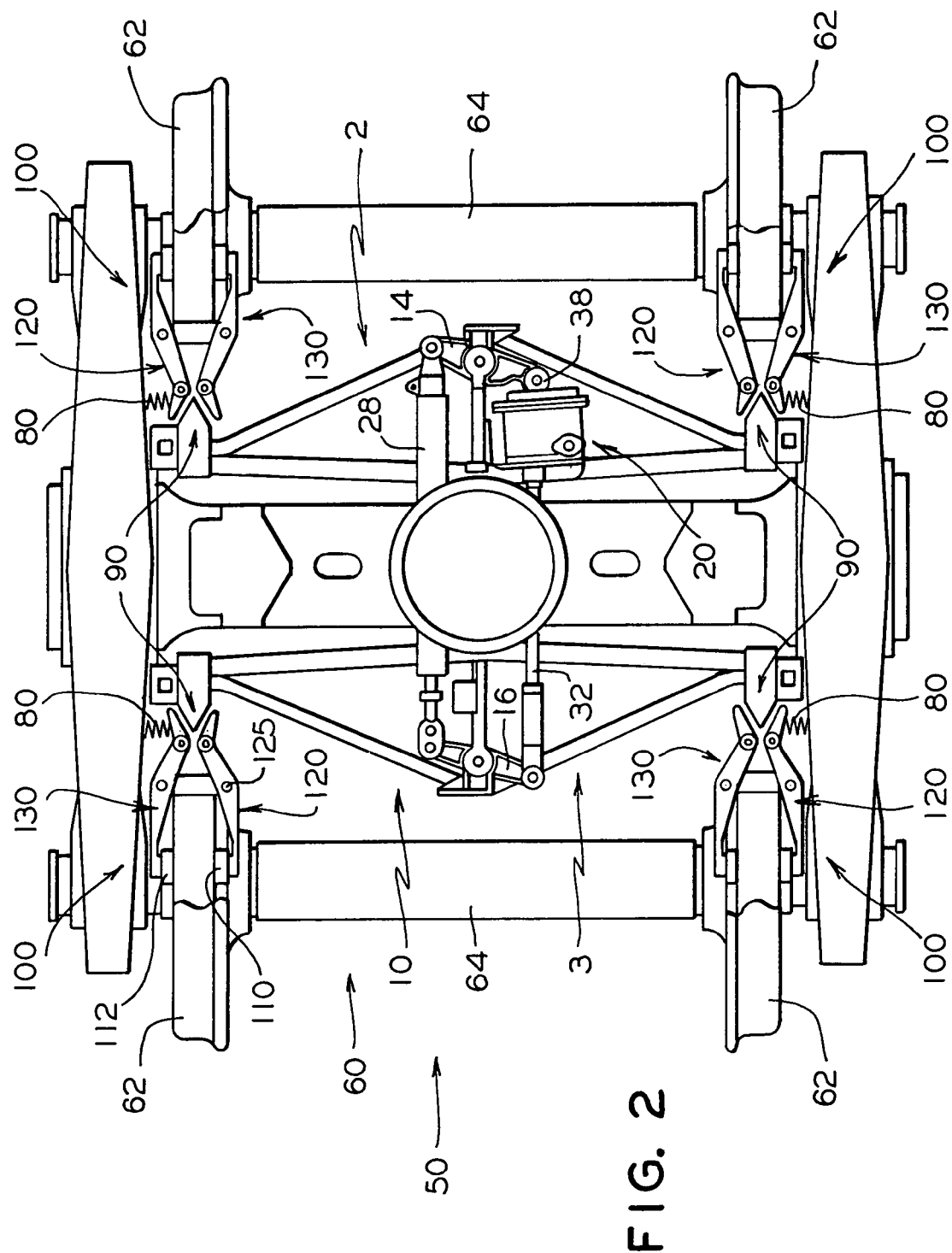
FIG. 2 is a plan view of a railway vehicle truck-mounted brake apparatus according to a presently preferred embodiment of the instant invention.

In further reference to FIG. 2, there is shown brake assembly 10 of the present invention mounted to a truck, generally designated 50, of a railway car (not shown). The truck 50 includes a pair of axle assemblies, generally designated 60, comprising a pair of wheels 62 joined by an axle 64.

In the presently preferred embodiment, a predetermined plurality of wedge elements, generally designated 90, are rigidly attached at each outer end of brake beams 2 and 3, preferably at a first surface portion 92. Each wedge 90 includes a second surface portion 94 joining a third surface portion 96 at a predetermined angle oriented toward the wheel 62. Preferably, such predetermined angle is acute.

Figure 3:
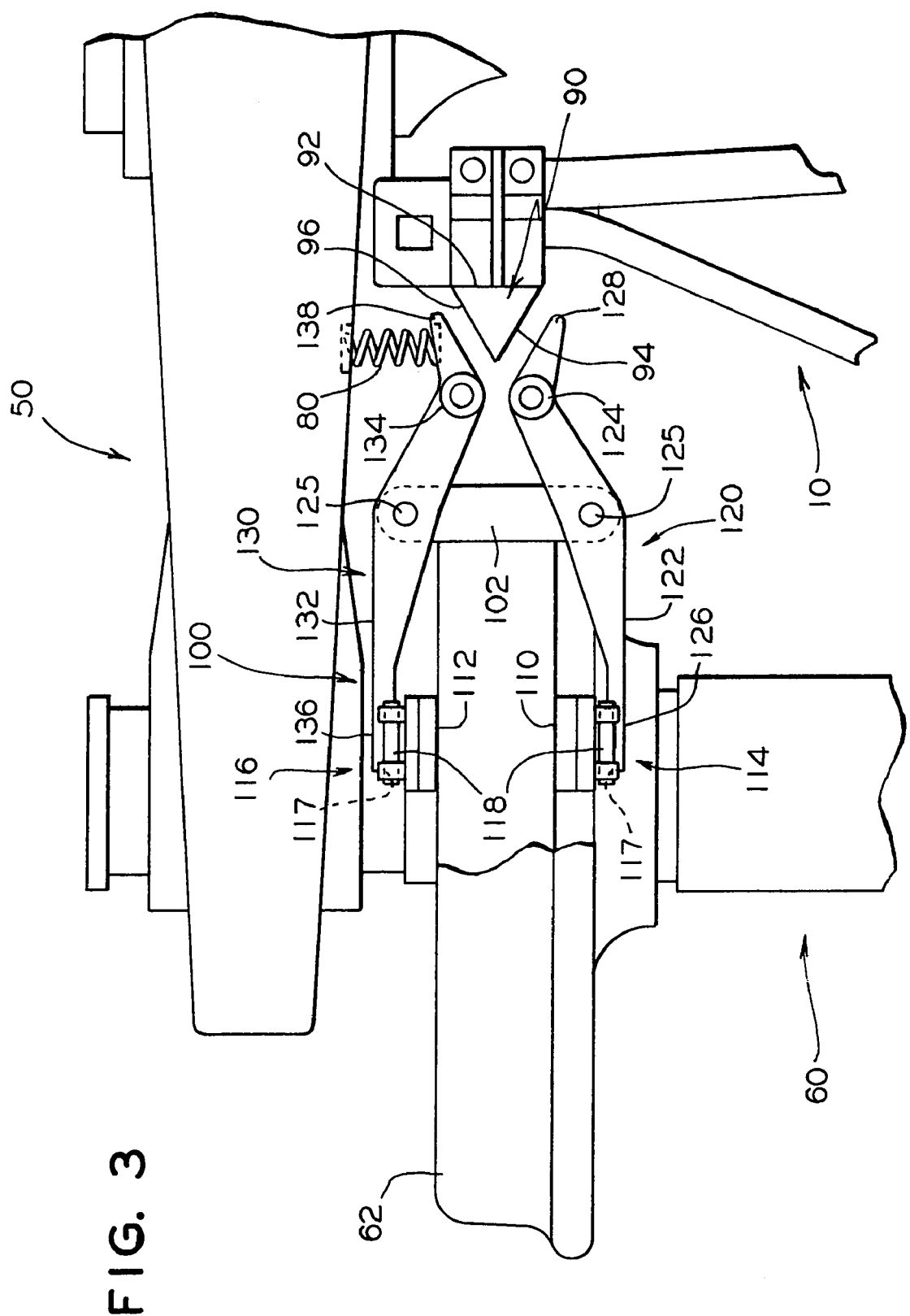
FIG. 3 is a partial plan view of the railway vehicle truck-mounted brake apparatus of the present invention particularly showing details of the disk caliper assembly of FIG. 2.

A disk caliper assembly, generally designated 100, best shown in FIG. 3, comprises a mounting bracket 102 rigidly attached to the truck 50 and a pair of opposed brake shoe assemblies 110 and 112, provided with a suitable brake lining and disposed in a position for contact with the respective opposed rotor braking faces (not shown) attached to the wheel 62. The brake shoe assemblies 110 and 112 are respectively carried by a pair of opposed brake head assemblies 114 and 116.

The first brake head assembly 114 is pivotally mounted adjacent the first end 126 of a first lever or tong, generally designated 120, by means of a pin 118 that extends through aligned coaxial apertures 117 provided therefore in brake head assembly 114 and lever 120. Likewise, the second brake head assembly 116 is pivotally mounted on the first end 136 of a second lever or tong, generally designated 130.

The first lever 120 is pivotally mounted intermediate its first end 126 and second end 128 of the main portion 122 on the hereinbefore-mentioned supporting bracket 102 adjacent one end thereof. Likewise, the lever 130 is pivotally mounted intermediate its first end 136 and a second end 138 of the main portion 132 on the supporting bracket 102. The second ends 128 and 138 of the first and second levers 120 and 132 respectively are bifurcated to enable pivotally mounting thereon a pair of rollers 124 and 134. In the preferred embodiment, the ends 128 and 138 are curved outwardly to facilitate guiding of the wedge 90.

The disk caliper assembly 100 is further connected to the truck 50 via at least one spring means 80 for aligning the disk caliper assembly 100 during railway vehicle motion. In the presently preferred embodiment, the spring 80 is of a floating type to maintain the disk caliper assembly 100 in a predetermined position with respect to a wheel 62 during motion of the railway vehicle, particularly, around a curve.

When the brake application is made and the cylinder 20 is pressurized, the resulting force generated within brake assembly 10 will move each wedge 90 outwardly engaging rollers 124 and 134 disposed within the disk caliper assembly 100. Accordingly, each wedge 90 transmits generated force to the levers or tongs 120 and 132 via the second and third surfaces 94 and 96 respectively and the rollers 124 and 134. Therefore, the force transmitted to the lever 120 acts in the direction to rock this lever clockwise about the pin 125 to cause the brake lining of the brake shoe assembly 110 to be pressed against the rotor braking face (not shown) of the wheel 62.

Likewise, the force transmitted to the lever 130 causes the brake shoe assembly 112 to be pressed against the opposite rotor braking face (not shown) of wheel 62. Spring means 80 maintains alignment of the disk caliper assembly 100 in respect to the truck 50 so that the second and third surface portions 94 and 96 respectively of the wedge 90 equally engage rollers 124 and 134 in order to equally engage both brake shoe assemblies 110 and 112 with the wheel 62 braking faces (not shown).

The braking force is transmitted substantially equally to opposite side surfaces of the wheel 62 thus preventing unwanted wheel 62 movement during a brake application.

As these brake shoe assemblies and/or the rotor braking faces (not shown) wear away, the fluid under pressure inside the brake cylinder 20 transmits a force to levers 14 and 16 via the slack adjuster 28 to further move wedge elements 90 and transmit force to levers 120 and 130 for pivoting these levers such that the brake shoe assemblies 110 and 112 are pressed against the rotor braking faces (not shown) of wheel 62. Thus, the levers 120 and 130 are pivoted in opposite directions through a small angle corresponding to the amount of wear of the brake shoe assemblies and/or braking faces occurring while a brake application is in effect.

When it is desired to release the brake application, the fluid under pressure previously supplied to the cylinder 20 is vented in the usual manner to atmosphere.

As the wedge 90 is thus shifted in the direction of the right hand, as viewed in FIG. 3, it can be readily seen that the rollers 124 and 134 are caused to respectively roll along the second and third surface portions 94 and 96 respectively of said wedge 90.

Accordingly, it is apparent that as the roller 124 rolls along the wedge surface portion 94, the lever 120 is pivoted in an opposite direction to discontinue contact of brake shoe assembly 110 with the wheel 62 braking face. Likewise, as the roller 134 rolls along the wedge surface portion 96, the lever 130 is pivoted in an opposite direction to discontinue contact of the brake shoe assembly 112 with the wheel 62 braking face.

Currently used TMX truck mounted brake apparatus may be retrofitted with the embodiments of the present invention by replacing regular brake shoes with the wedges 90 and installing brake caliper units 100 and wheel braking faces.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

We claim:

1. A brake rigging engageable with a truck portion of a railway vehicle, said brake rigging comprising:
    (a) a braking apparatus including a pair of brake beams associated with each wheel set of said railway vehicle, a pair of force-transfer levers pivotally connected to a strut member of each of said pair of brake beams and further connected to a first force-transmitting member, a brake cylinder assembly mounted on one of said pair of brake beams and associated with a first force-transfer lever, a second force-transmitting member connected to said brake cylinder assembly at one end and connected to a second force-transfer lever at a distal end, whereby pressurization of said brake cylinder assembly enables said braking apparatus to generate a braking force;
    (b) a plurality of wedge means each attached to a respective end of each of said pair of said brake beams for transmitting said braking force, each of said plurality of wedge means includes a first force transmitting surface portion and a second force transmitting surface portion forming a predetermined angle disposed in a horizontal plane and extending outwardly from each of said pair of brake beams toward a respective one of a plurality of wheels of such truck portion;
    (c) a means disposed within such truck portion intermediate said plurality of wedge means and each of said plurality of wheels of such railway vehicle and operable by said plurality of wedge means, upon direct engagement therewith for simultaneously applying said braking force to each of said plurality of wheels of such truck portion; and
    (d) means directly connecting said means for applying said braking force to side members of such truck portion for compensating movement of such truck portion during said braking force application and for aligning said means for applying said braking force in a predetermined position about each of said plurality of wheels.

2. A brake rigging for a railway vehicle according to claim 1, wherein said predetermined angle is acute.

3. A brake rigging for a railway vehicle according to claim 1, wherein said means for applying said braking force includes a plurality of assemblies associated with each of said plurality of wheels, each of said plurality of assemblies having:
    (a) a mounting member rigidly attached to said truck portion;
    (b) a pair of force-applying levers having a first end and a second end and pivotally mounted at each end of said mounting member intermediate said first and said second end;
    (c) a pair of rollers each pivotally mounted at said first end of each of said pair of force-applying levers and respectively and directly engaging said first and second force transmitting surface portions for receiving said braking force;
    (d) a pair of disc brake shoe assemblies each pivotally attached at said second end of each of said pair of force-applying levers and engaging opposed exterior side wheel surfaces for applying said braking force, whereby said braking force generated by said brake cylinder assembly causes said plurality of wedge means to move outwardly and simultaneously engage each of said pair of rollers enabling pivoting of each of said pair of force-applying levers and enabling engagement of each of said pair of disc brake shoe assemblies with said exterior side wheel surfaces for equally applying said braking force to each of said plurality of wheels.

4. A brake rigging for a railway vehicle according to claim 3, wherein said first end of each of said pair of force-applying levers curves outwardly for guiding said plurality of wedge means.

5. A brake rigging for a railway vehicle according to claim 3, wherein said force-applying levers disposed within said means for applying said braking force cooperate with said brake cylinder generating a continuous braking force to compensate for a wear of a brake shoe disposed within said disk brake shoe assemblies.

6. A brake rigging for a railway vehicle according to claim 1, wherein said means for compensating movement of such truck portion during said braking force application includes a predetermined plurality of spring means each disposed adjacent a respective one of said plurality of wheels and engaging said means for applying said braking force at one end and engaging such truck portion at a distal end.

7. A brake rigging for a railway vehicle according to claim 6, wherein said spring means is a floating spring means within said brake rigging.

* * * * *